July 18, 1950          A. LISSIANSKY          2,515,350
SELF-POSING PHOTOGRAPHIC APPARATUS
WITH ADJUSTABLE REFLECTOR
Filed Feb. 18, 1946

INVENTOR.
ALEXANDER LISSIANSKY
BY Edwin Levisohn
ATTORNEY

Patented July 18, 1950

2,515,350

UNITED STATES PATENT OFFICE 2,515,350

SELF-POSING PHOTOGRAPHIC APPARATUS WITH ADJUSTABLE REFLECTOR

Alexander Lissiansky, Long Island, N. Y., assignor to International Mutoscope Corporation, Long Island, N. Y., a corporation Application February 18, 1946, Serial No. 648,299

2 Claims. (Cl. 88—74)

This invention relates to photographic apparatus of the type which are installed in public places and by which any person may take a photograph of himself or herself on depositing a coin in the apparatus.

In photographic apparatus of this type, recourse is preferably had to the so-called "re-exposure" or "re-development" process for producing the positive picture on the exposed sensitized plate and delivering the same to the subject within a short time after the exposure is made. To carry out this process rapidly and economically, it is customary to mount the camera in vertical disposition, and to project the image of the subject upon the camera lens through a reflecting mirror or mirrors mounted in the apparatus. For the sake of convenience, and also to simulate studio photography, a seat is provided on which the subject may sit for the exposure. Posing is left entirely to the subject, but the subject's head must be in a definite position relative to the mirror in order to obtain a portrait-like picture. To this end, the seat is usually made adjustable in height and the subject is to adjust the seat until his or her eyes are level with a fixed mark on the apparatus. Adjustment of the seat is, however, inconvenient to most since they have to get up to do so, and accurate adjustment is usually attained only after several trials.

It is the primary object of the present invention to relieve the subject of the necessity of posing with his or her head at a certain fixed level in front of the mirror, and instead provide facilitates whereby the subject may, while comfortably seated and assuming a desired pose, adjust the mirror until he or she can see the image of the camera lens in the mirror, at which adjustment the mirror also reflects the image of the subject upon the camera lens, whereupon the exposure may be made.

The above object of the invention and other objects ancillary thereto will be fully understood from the following description, considered with reference to the accompanying drawings, in which.

Figure 1:
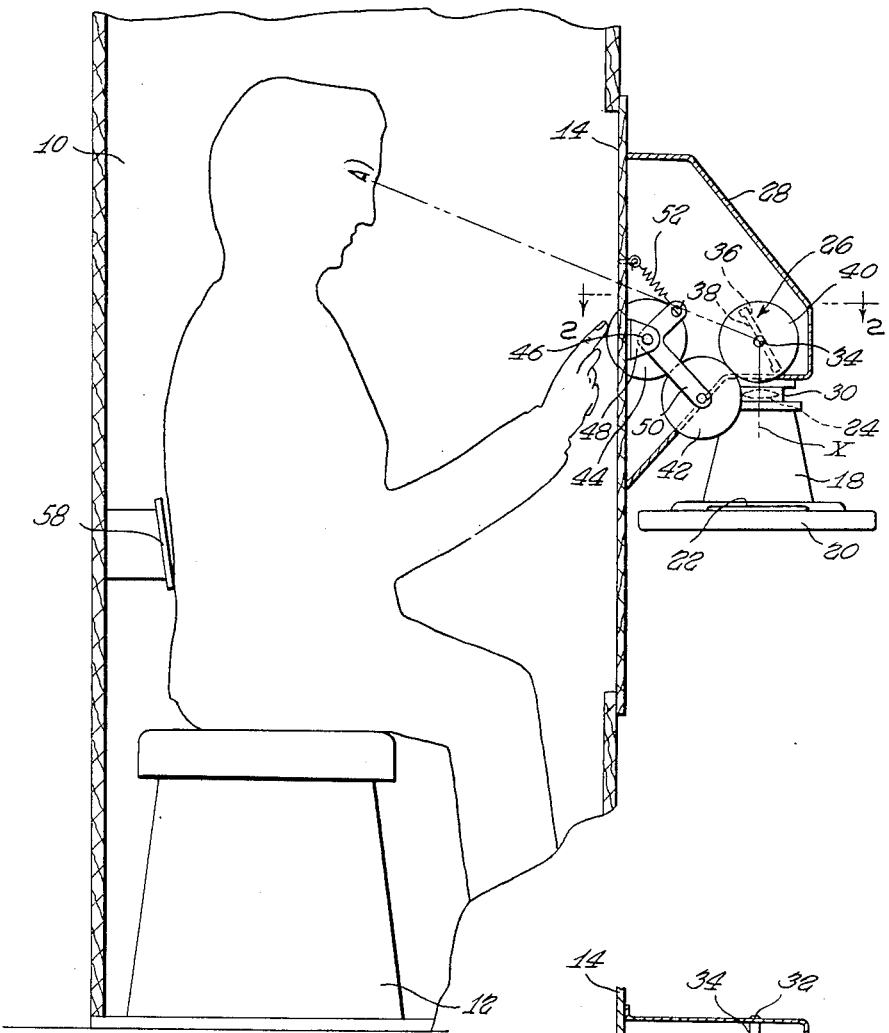
Fig. 1 is a fragmentary section through a photographic apparatus of the referred type, embodying the present invention.
Figure 2:
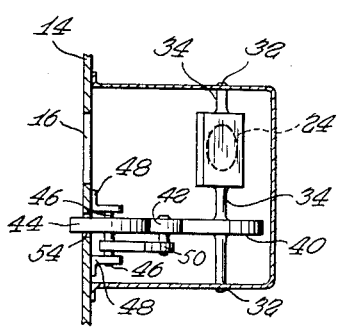
Fig. 2 is a horizontal section through the image-reflector unit of the apparatus, the section being taken on the line 2—2 of Fig. 1.

Referring to the drawings, and particularly to Fig. 1 thereof, there is illustrated a section of a photographic apparatus of the type referred to. This apparatus may be essentially like that shown in the patent to Rabkin et al. No. 2,192,755, dated March 5, 1940, and comprises a compartment or booth 10 in which a subject may pose in comparative privacy. A comfortable, non-adjustable seat 12 is provided in the booth 10 on which the subject may be seated. Mounted in front of the booth 10 is a panel 14, having a window 16 (Fig. 2). In back of the panel 14 is a camera 18 which is vertically mounted on a supporting table 20. As fully explained in the above-mentioned patent, a sensitized plate 22 is, on deposition of the proper coin or coins in the apparatus, automatically placed under the camera for the exposure, and is then advanced over the table 20 to a developing unit (not shown).

Figure 3:
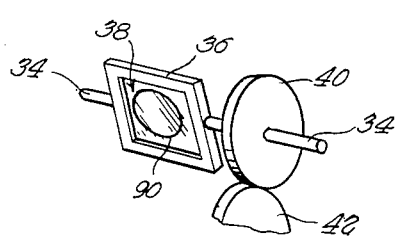
Fig. 3 illustrates perspectively certain parts of the reflector unit shown in Fig. 2.

In order to project the subject's image upon the fixed horizontal lens 24 of the camera for the exposure, there is provided a reflector unit 26 which is preferably enclosed in a casing 28 in back of the panel 14. The lens tube 30 of the camera extends to the casing 28 and is open to the latter so that only light from said casing may enter the lens tube. Journalled at 32 in the casing 28 is a horizontal shaft 34 (Figs. 1 and 2) which is provided intermediate its ends with a frame 36 for holding a plane mirror 38 (see also Fig. 3). The window 16, mirror 38 and lens tube 30 are in alignment so that the image of a subject seated in front of the window 16 may be projected by the mirror 38 upon the lens 24. The mirror 38 is, in the present instance, rectangular, and its rotary axis preferably coincides with its longitudinal axis and is intersected by the longitudinal axis $x$ of the camera (Fig. 1).

In order to turn the mirror 38 so as to project the image of a seated subject upon the lens 24 of the camera, there is provided a train of friction disks 40, 42 and 44. Disk 40 is mounted on the mirror shaft 34 inside the housing 28, while disk 44 is mounted with its opposite journals 46 in bearing brackets 48 on the panel 14. Disk 42 is an idler journalled somewhat floatingly in the long arm of a bell-crank lever 50 which is rotatably mounted on one of the journals 46 of the disk 44. The idler disk 42 is yieldingly retained in frictional engagement with the disks 40 and 44 by a spring 52 (Fig. 1) which acts on the lever 50. The disk 44 projects through a slot 54 in the panel 14, to be turned by the subject's hand in order to cause the mirror 38 to turn.

After the subject, in the present instance a man, has become seated in the booth 10, he turns the disk 44 until he sees the image of the camera lens 24 in the mirror 38, and preferably in the center thereof. Conversely, the mirror 38 is then in the proper angular position to project the subject's image upon the lens 24 in such fashion that the subsequent exposure and development of the sensitized plate 22 will result in a picture which compares favorably with studio photography.

In thus enabling the subject to personally direct the camera upon himself, he is more conscious of posing, and will pose better than heretofore in apparatus of this type, where he took no direct personal part in directing the camera upon himself, with the result that he now obtains a better picture of himself. To keep the seated subject at the proper distance from the window 16 and also assist him in assuming a correct posture, there is provided a back rest 58 against which the subject will lean substantially midway of his back.

When the present invention is embodied in a photographic machine of the type disclosed in the above mentioned patent to Rabkin et al., No. 2,192,755, panel 14 is preferably a door which is suitably hinged (not shown) to the front of the booth 10 so as to open into the latter for ready access to the interior of the camera cabinet of the apparatus. In accordance with the present invention, the mechanism for adjusting the mirror or reflector 38 is so arranged as shown in Figs. 1 and 2 that it can be mounted on the door (panel 14) in such manner as to permit the door to be opened and closed without requiring disconnection of parts of the mechanism which are located back of the door. Accordingly, it will be observed that in the construction illustrated in Figs. 1 and 2 all of the mirror adjusting mechanism except the friction disk 40, which is mounted on the mirror shaft, is carried by the door for movement therewith, and it will be noted that when the door is closed, the disk 42 is automatically positioned in releasable driving engagement with disk 40.

It will also be noted that the mechanism for adjusting the mirror or reflector 38 is so constructed that the part which is operated by the individual who is posing for the picture is movable in the same direction in which the mirror or reflector must be moved to center the image of the camera lens 24 in the mirror. Preferably, the face of the mirror which is viewed by the subject through the window opening 16 of the panel is provided with a suitable centering guide, for example, a circular line as indicated at 90 in Fig. 3 to aid the subject in centering the image of the camera lens 24 in the mirror. If desired, the border of the mirror outside the circle 90 may be blackened so that the image of the camera lens is not visible until it is brought within the outline of said circle.

It will be understood that the invention may be embodied in a photographic machine having the mirror 38 at a height suitable for taking the picture of a subject when the latter is in standing or upright position, instead of being seated as illustrated in Fig. 1. Since in such case, the vertical position of the subject's head in relation to the reflector 38 is fixed, as in the case when the subject is seated on the non-adjustable seat 12, the present invention provides for the proper adjustment of the reflector 38 for transmitting the image to the photographic plate 22 in the camera.

It will be understood that various mechanisms other than those herein specifically illustrated or described may be utilized for accomplishing the objects of the present invention without departing from the underlying idea or principles thereof within the scope of the appended claims.

I claim:

1. In photographic apparatus, the combination with an upright partition having a window and an opening, and a camera having a lens and being mounted behind said partition, of a mirror mounted behind said window for tilting movement about a fixed horizontal axis in opposite directions to any one of an infinite number of angular adjustment positions within predetermined limits to reflect the image of said lens to persons' eyes at various levels, respectively, in front of said window, and means for positively tilting said mirror in either of said directions for adjusting the position of said mirror, said means comprising a train of drivingly engaged discs behind said partition of which an end disc turns coaxially with said mirror and the other end disc extends through said opening in the partition so as to be manually turnable in front of the latter.

2. In photographic apparatus, the combination with an upright partition having a window and an opening, and a camera having a lens and being mounted behind said partition, of a mirror mounted behind said window for tilting movement about a fixed horizontal axis in opposite directions to any one of an infinite number of angular adjustment positions within predetermined limits to reflect the image of said lens to persons' eyes at various levels, respectively, in front of said window, and means for positively tilting said mirror in either of said directions for adjusting the position of said mirror, said means comprising a first disc turnable coaxially with said mirror, another disc turnable behind said partition about its own axis and being drivingly engaged with said first disc, and a member drivingly connected with said other disc and projecting through said opening in the partition to the front of the latter so as to be manually operable for turning said other disc.

ALEXANDER LISSIANSKY.

REFERENCES CITED

The following references are of record in the file of this patent:

UNITED STATES PATENTS

| Number | Name | Date |
|---|---|---|
| 1,799,767 | Simjian | Apr. 7, 1931 |
| 1,926,657 | Simjian | Sept. 12, 1933 |
| 2,105,557 | Slack | Jan. 18, 1938 |
| 2,304,049 | Orcutt et al. | Dec. 1, 1942 |
| 2,311,914 | Tiffin | Feb. 23, 1943 |